C. KAISER.
SAW SETTER.
APPLICATION FILED JULY 14, 1915.
1,176,565.
Patented Mar. 21, 1916.
2 SHEETS—SHEET 1.
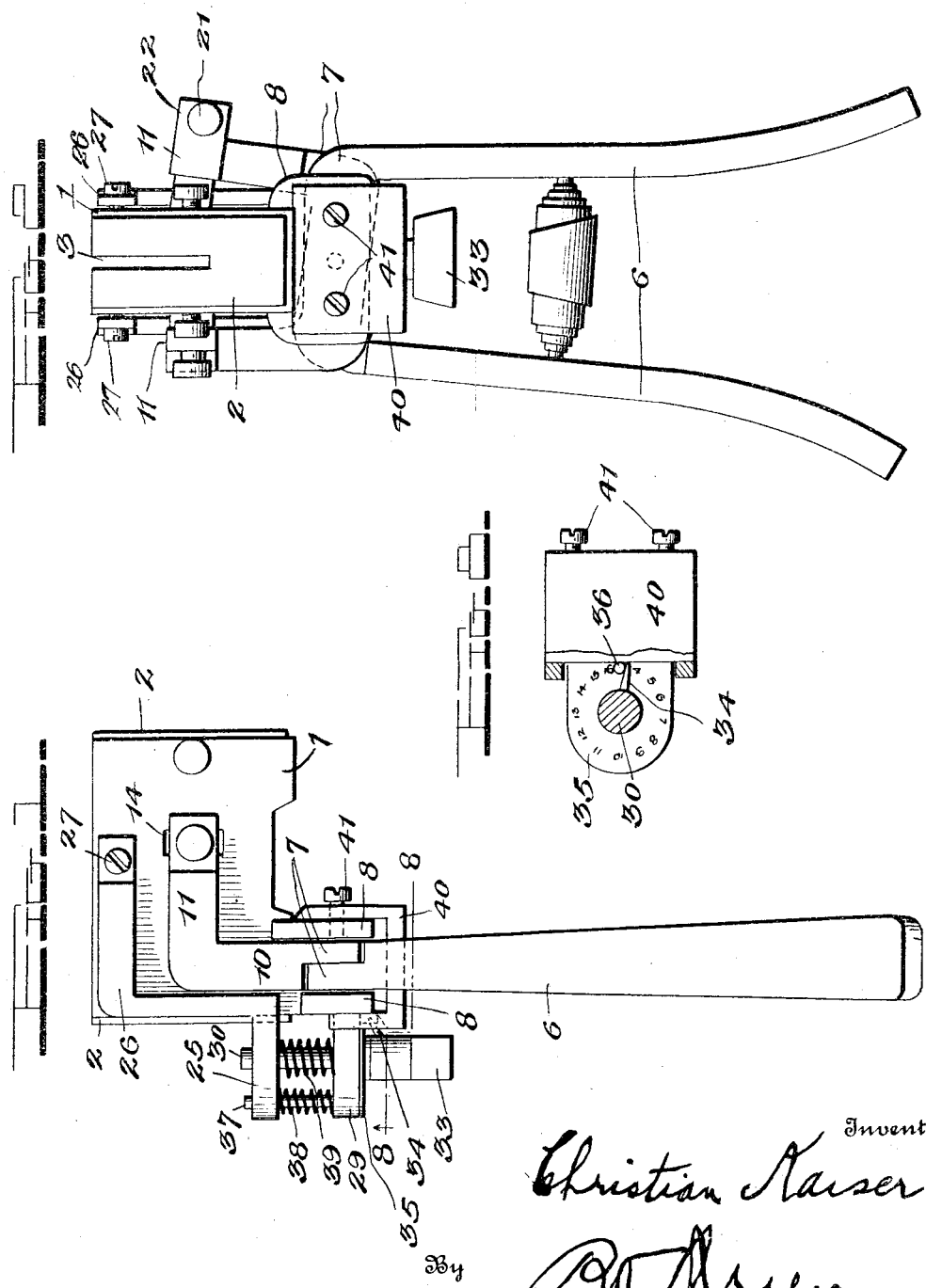

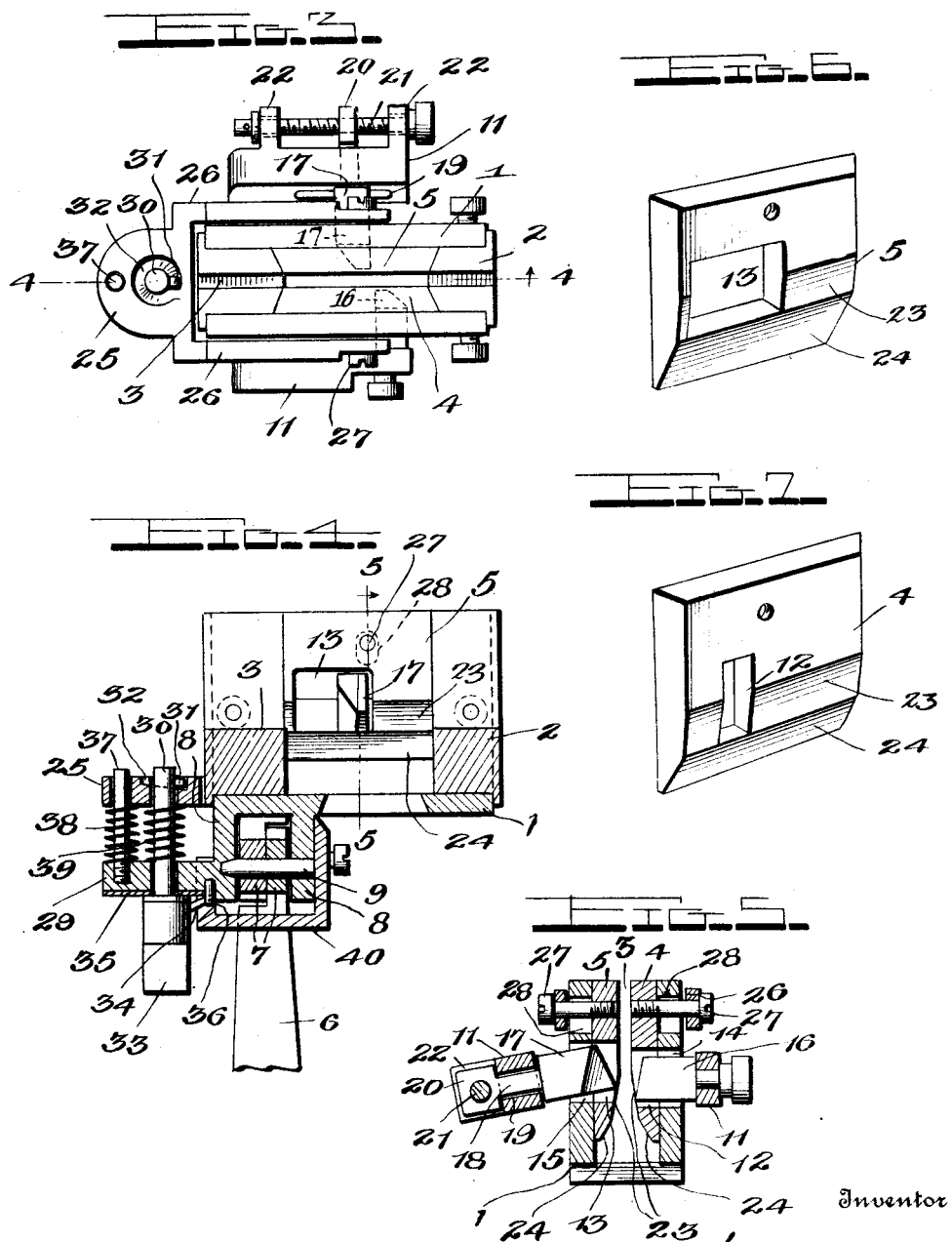

UNITED STATES PATENT OFFICE.

CHRISTIAN KAISER, OF DEVILS LAKE, NORTH DAKOTA.

SAW-SETTER.

1,176,565.   Specification of Letters Patent.   Patented Mar. 21, 1916.

Application filed July 14, 1915. Serial No. 39,919.

*To all whom it may concern:*

Be it known that I, CHRISTIAN KAISER, a citizen of the United States, residing at Devils Lake, in the county of Ramsey and State of North Dakota, have invented new and useful Improvements in Saw-Setters, of which the following is a specification.

This invention pertains to new and useful improvements in saw setters and especially to a setter of the double type, and it has for its primary aim to provide a device of the above character which will operate efficiently and expeditiously.

A further object resides in the provision of a double setter that will perform a saw setting operation by making a straight track on both sides.

The invention further resides in the adjustable mounting of the saw setting means, and the adjustable anvils, both of which adjustable features adapt the invention for setting saws of varying sizes.

Further aims and objects will appear as the description progresses and those features of construction, arrangements and combinations of parts on which protection is desired will be succinctly claimed hereinafter.

In the accompanying drawings, which illustrate the preferred embodiment of the invention and wherein like characters of reference denote corresponding parts throughout the several views: Figure 1 is a side elevation of saw set embodying the present improvements; Fig. 2 is an end elevation thereof; Fig. 3 discloses the same in top plan; Fig. 4 is a vertical section on line 4—4 of Fig. 3; Fig. 5 is a vertical transverse section taken about on line 5—5 of Fig. 4; Figs. 6 and 7 are perspectives of the two anvil plates; and Fig. 8 is a horizontal section along line 8—8 of Fig. 1.

The invention comprises a body 1 of U-section in the ends of which are arranged saw straighteners or bushings 2, preferably of copper and formed with alined saw-receiving slots 3, the opposing ends of the bushings being shaped on a bias to form, in conjunction with the sides of the body, dovetailed grooves in which the anvil plates 4 and 5 are slidably disposed. The inner faces of the anvil plates aline with the walls of slots 3 and thereby form a long saw-receiving slot in the body 1 by which the saw is maintained straight or in a flat condition during a setting operation.

The yieldably separated handles 6 are formed with angularly disposed journal portions 7 which operate and are secured between the depending ears 8 of body 1 by pivot pin 9. Extending upwardly from the free end of each horizontal portion 7, and on the opposite side of the body, is an angular arm 10 terminating in a horizontal portion 11.

The anvil plates are formed with openings 12 and 13, the latter being elongated and horizontally formed, while each opening registers with a corresponding opening 14, 15 formed in the walls of the body. Operable in the openings 12, 13, 14 and 15 are setter pins 16 and 17, the former being fixed to one of the horizontal arm portions 11 while the latter, which operates in openings 13, is adjustable longitudinally on the other arm portion 11. The pin 17 is formed with a shank 18 slidable in the slot 19 of the arm portion or extension 11 and an apertured head 20 which has threaded engagement with a screw member 21, the latter being journaled in spaced ears 22 of said arm extension. Thus, upon rotating the screw 21, the setter pin 17 is advanced toward or retracted from the coöperating pin 16, the slots 13 and 15 accommodating for such adjustability.

Each anvil plate is formed on its lower part with a face 23 of slight inclination and an adjoining face 24 of greater inclination which faces may be adjusted vertically from or toward the setter pins. The setting pins 17 and 18 are adapted to press the saw teeth against the setting faces 23 for setting the saw, the anvil faces 24 providing clearance for such operation. The mechanism for accomplishing this adjustability of the anvil plates comprises a plate 25 having spaced parallel arms 26 of right angular formation straddling the body 1 and guiding the plate for sliding movement. The anvil plates are secured to the terminals of arms 26 by screws 27 which operate in vertical slots 28 of the body. It will therefore be noted that on sliding the anvil plate adjusting member 25, the plates 4 and 5 will accordingly be moved vertically, the openings 12 and 13 accommodating such movement as shown in Fig. 5.

The outer one of the ears 8 is formed with a lateral bearing or support 29 which underlies the plate 25. These superposed members are formed with alined journals in which is rotatably mounted an adjusting stem 30 the upper end of which carries a lug 31 adapted for coaction with the encircling cam portion 32 formed on the plate 25. The lower terminal of the stem carries a handle or knob 33 and a pointer 34, the latter being associated with a dial 35 and limited in its movement by a stop pin 36 whereby the stem may not be completely rotated. Upstanding from support 29 is a guiding pin 37 which is slidably received in an opening of the plate 25. Springs 38, 39 encircle the stem and guiding pin and tend to separate the plate from the support for retaining the lug 31 against the cam 32.

In practice, the saw edge is inserted in the slot 3 and the handles 6 pressed together whereupon the setter pins are projected inwardly against the opposite anvil plates. The lateral spacing of the setter pins may be adjusted by screw 21 and by setting the stem, by the aid of pointer 34 and dial 35, the anvil plates may accordingly be adjusted for various sizes and styles of saws. To inclose the pivotal mounting of the handles, a cover plate 40 is detachably secured to the ears 8, as by screws 41.

What is claimed is:

1. A saw set comprising a body of U-sections, slotted saw straightener members mounted in the ends thereof and having their inner ends shaped to form in conjunction with the sides of the body dovetailed grooves, anvil plates disposed in the formed grooves, and saw setting means coöperating with the anvil plates.

2. A saw set comprising a body of U-sections, slotted saw straightener members mounted in the ends thereof and having their inner ends shaped to form in conjunction with the sides of the body dovetailed grooves, anvil plates slidable in the formed dovetailed grooves, the plates being provided with openings, setter pins operable in the plate openings, means for sliding the plate, and means for operating the pins.

3. A saw set comprising a body of U-sections, slotted saw straightener members mounted in the ends thereof and having their inner ends shaped to form in conjunction with the sides of the body dovetailed grooves, anvil plates slidably arranged in the grooves formed, an anvil plate sliding member consisting of a plate body having spaced arms straddling the first body and secured to the anvil plates, a set stem carried by the first body and projecting through an aperture formed in the plate body, the latter being also formed with a cam portion concentric with the aperture thereof, a lug on the projecting stem for coöperation with the cam portion of the plate body, and saw setting means associated with the anvil plates.

4. A saw set comprising a body having a saw-receiving slot, opposing plates slidably mounted on the body on opposite sides of the slot and each formed with a setting face, spaced depending ears on the body, said anvil plates and body being further provided with registering openings, handles pivoted between the depending ears and passing on opposite sides of the body, setting pins operable in the registering openings of the body and anvil plates and connected with the handles, and means to slide the anvil plates simultaneously for adjusting their setting faces relative to the pins.

5. A saw set comprising a body having a saw-receiving slot and openings in the walls of the slot, anvil plates having setting faces and provided with openings registering with the body openings, setting pins operable through the body openings, and means for simultaneously adjusting the anvils and their setting faces relative to the pins.

6. A saw set comprising a body of substantially U-section provided in its side walls with slots, anvil plates slidably disposed in opposing relation on the side walls, setting pins operable against the plates, and means for simultaneously sliding the plates consisting of a pair of connected arms straddling the body, screws passing through the body slots and connecting the arms to the anvil plates, and means slidably supporting the pair of arms.

7. In a saw set, an adjustably mounted anvil having a setting face inclined in the direction of adjustment, and a setter pin coöperating with the anvil face and adapted to remain stationary during adjustment of the anvil.

8. A saw set comprising a body having a saw-receiving slot, pivotally mounted handles connected to the body and terminating in arms extending alongside of the latter, one of the arms being horizontally slotted, and setting pins carried by the arms, one of the pins being carried by the slotted arm for horizontal adjustment in the slot thereof relative to the other pin.

9. A saw set comprising a body having a saw-receiving slot, pivotally mounted arms on the body and extending on opposite sides thereof, one of the arms extending horizontally and being slotted, spaced ears carried by said slotted arm and arranged at the opposite ends of the slot, a rotatable screw journaled in the ears, a setting pin slidable in the arm slot and provided with an apertured head threadedly engaged with the screw, a second setting pin carried by the other arm, said pins being operable across the body slot, and means for operating the arms.

10. In a saw set, opposing adjustably mounted anvils having setting faces inclined in the direction of adjustment, a setter pin coöperating with each anvil face, and means for adjusting one pin relative to the other pin in a direction transverse to the inclination of the anvil faces.

11. In a saw set, opposing anvils having setter pin openings and inclined setting faces extending below the openings, a setter pin operable through the opening of each anvil for coöperation with the setting face of the other anvil, and means for adjusting the anvils in the direction of inclination of their faces and relative to the pins.

12. In a saw set, an anvil having a setting face, a setting pin coöperating therewith, a slidable support for the anvil, and cam means for sliding the support.

13. A saw set comprising a body having a saw receiving slot, an anvil slidable on each side of the body slot, a lateral support carried by the body, a plate overlying the support and provided with spaced arms straddling the body, means securing the arms to the anvils, and means carried by the lateral support and engaging with the plate for sliding the latter.

14. A saw set comprising a body having a saw receiving slot, an anvil slidable on each side of the body slot, a lateral support carried by the body, a plate overlying the support and provided with spaced arms straddling the body, means securing the arms to the anvils, said plate and support being formed with registering openings, a cam surrounding the plate opening, a dial about the support opening, a stem rotatable in the registering openings of the plate and support and provided with a projection coöperating with the cam to slide the plate, and a pointer carried by the stem for association with the dial.

In testimony whereof I have hereunto set my hand in presence of two subscribing witnesses.

CHRIST. KAISER.

Witnesses:
LLOYD B. STEVENS,
EDMUND LYNN.

Copies of this patent may be obtained for five cents each, by addressing the "Commissioner of Patents, Washington, D. C."